US011031851B2

(12) United States Patent
Okada et al.

(10) Patent No.: US 11,031,851 B2
(45) Date of Patent: Jun. 8, 2021

(54) GEAR SYSTEM FOR ELECTRIC VEHICLE

(71) Applicant: NISSAN MOTOR CO., LTD., Yokohama (JP)

(72) Inventors: Tomohiro Okada, Kanagawa (JP); Naoaki Oikawa, Kanagawa (JP); Takahiro Saruwatari, Kanagawa (JP); Tatsuhiko Ikeda, Kanagawa (JP); Ken Nakayama, Kanagawa (JP); Kazuhiko Soeda, Kanagawa (JP); Akinori Inada, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 243 days.

(21) Appl. No.: 15/372,818

(22) Filed: Dec. 8, 2016

(65) Prior Publication Data

US 2017/0126105 A1 May 4, 2017

Related U.S. Application Data

(63) Continuation of application No. 13/697,663, filed as application No. PCT/JP2011/002945 on May 26, 2011, now abandoned.

(30) Foreign Application Priority Data

May 27, 2010 (JP) .............................. JP2010-121145

(51) Int. Cl.
*H02K 11/40* (2016.01)
*H02K 7/116* (2006.01)
(Continued)

(52) U.S. Cl.
CPC .......... *H02K 11/40* (2016.01); *B60L 15/2054* (2013.01); *B60L 50/60* (2019.02);
(Continued)

(58) Field of Classification Search
CPC ........ H02K 7/10; H02K 7/116; H02K 7/1163; H02K 7/1166; H02K 11/40
(Continued)

(56) References Cited

U.S. PATENT DOCUMENTS 2,896,732 A 7/1959 Rist et al.
5,021,725 A 6/1991 Jimbo et al.
(Continued)

FOREIGN PATENT DOCUMENTS

JP 08-294249 A 11/1996
JP 2000-244180 A 9/2000
(Continued)

OTHER PUBLICATIONS

Takanori et al. (JP 2009296718 A) English Translation.*
(Continued)

*Primary Examiner* — Tulsidas C Patel
*Assistant Examiner* — Robert E Mates
(74) *Attorney, Agent, or Firm* — Foley & Lardner LLP

(57) ABSTRACT

A power transmission device for a vehicle is comprised of a motor including a rotor shaft and a stator having an electromagnetic coil; an inverter configured to generate an alternating current, the inverter being connected with the coil to controllably rotate the rotor shaft relative to the stator; a gear set including an input shaft coupled with and rotated by the rotor shaft, an output shaft and gears so meshed as to transmit torque of the input shaft to the output shaft; and a grounding path electrically connecting a part of the gear set with a body of the vehicle, the part being so disposed as to have the input shaft electrically interposed between the part and the rotor shaft.

14 Claims, 7 Drawing Sheets

(51) Int. Cl.
  *H02K 11/33* (2016.01)
  *F16H 3/091* (2006.01)
  *F16H 57/02* (2012.01)
  *B60L 15/20* (2006.01)
  *B60L 50/60* (2019.01)
  *H02K 21/14* (2006.01)

(52) U.S. Cl.
  CPC ............ *F16H 3/091* (2013.01); *F16H 57/02* (2013.01); *H02K 7/116* (2013.01); *H02K 11/33* (2016.01); *B60L 2270/147* (2013.01); *F16H 2057/02034* (2013.01); *F16H 2057/02043* (2013.01); *H02K 21/14* (2013.01); *Y02T 10/64* (2013.01); *Y02T 10/72* (2013.01)

(58) Field of Classification Search
  USPC ............ 310/83, 99, 220, 221, 225; 475/331; 123/197.1, 197.2, 197.3, 197.4, 197.5
  See application file for complete search history.

(56) References Cited

U.S. PATENT DOCUMENTS

| | | |
|---|---|---|
| 5,715,901 A | 2/1998 | Tokushima |
| 2005/0256631 A1 | 11/2005 | Cawthorne et al. |
| 2006/0138880 A1 | 6/2006 | Kimura et al. |
| 2006/0289248 A1 | 12/2006 | Noh |
| 2008/0088187 A1 | 4/2008 | Shao et al. |
| 2008/0224553 A1* | 9/2008 | Abe ................... H02K 5/15 310/71 |
| 2009/0121568 A1 | 5/2009 | Acosta et al. |
| 2009/0230791 A1 | 9/2009 | Scharfenberg et al. |
| 2009/0237905 A1 | 9/2009 | Motoda |
| 2009/0284099 A1* | 11/2009 | Horihata ................ H02K 5/141 310/249 |
| 2010/0102643 A1 | 4/2010 | Gaudenz et al. |

FOREIGN PATENT DOCUMENTS

| | | | |
|---|---|---|---|
| JP | 2000244180 A | * | 9/2000 |
| JP | 2000-310296 A | | 11/2000 |
| JP | 2000310296 A | * | 11/2000 |
| JP | 2006-320129 A | | 11/2006 |
| JP | 2007-166722 A | | 6/2007 |
| JP | 2007-288840 A | | 11/2007 |
| JP | 2009-029326 A | | 2/2009 |
| JP | 2009-296718 A | | 12/2009 |
| JP | 2009296718 A | * | 12/2009 |
| WO | WO-97/01200 A1 | | 1/1997 |
| WO | WO-2009/000809 A2 | | 12/2008 |

OTHER PUBLICATIONS

Takashi et al. (JP 2000244180 A) English Translation.*
Nomura et al. (JP 2000310296 A) English Translation.*
Filipino Office Action dated May 22, 2014, 2 pgs.
Gibilisco, S., "Teach Yourself Electricity and Electronics", 4th Edition, published Mar. 15, 2006, 721 pgs.
Japanese Office Action and English language translation dated Oct. 29, 2013 (9 pages) and partial translations of 2000-244180 and 2009-296718.
Russian Office Action with English Language Translation dated Mar. 5, 2014 (8 pgs.).

* cited by examiner

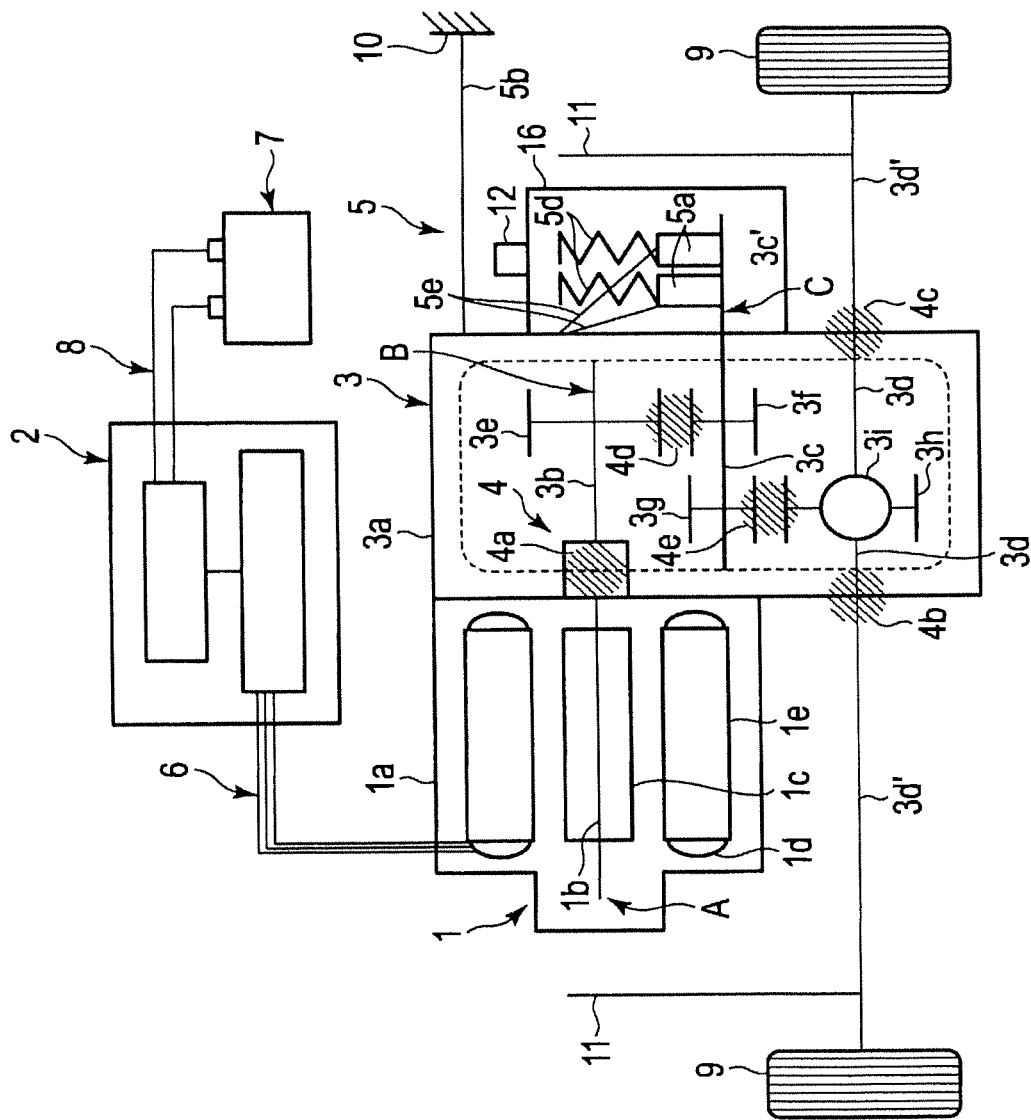
[Fig. 1]

[Fig. 2]
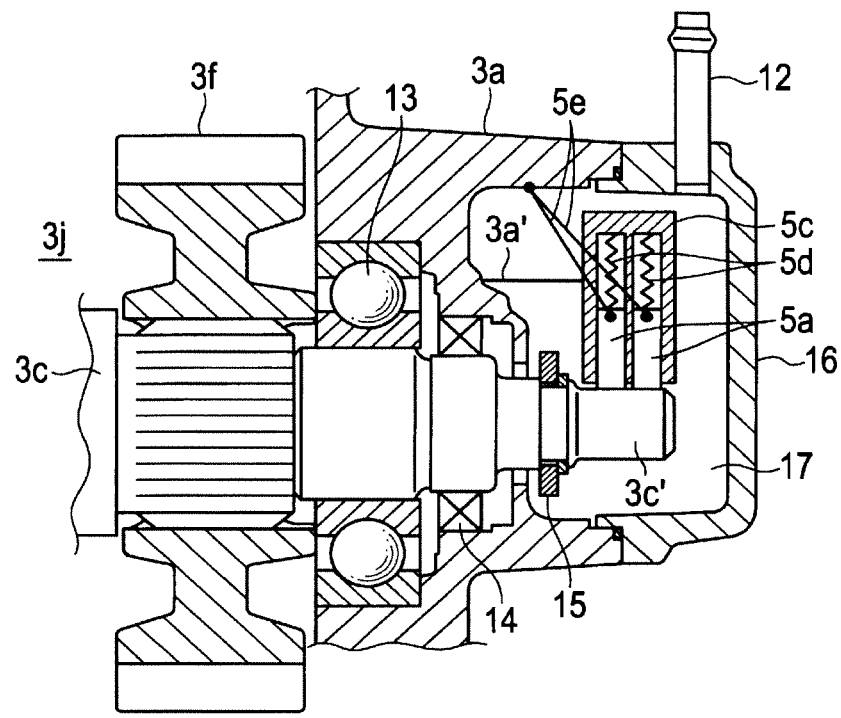
[Fig. 3]
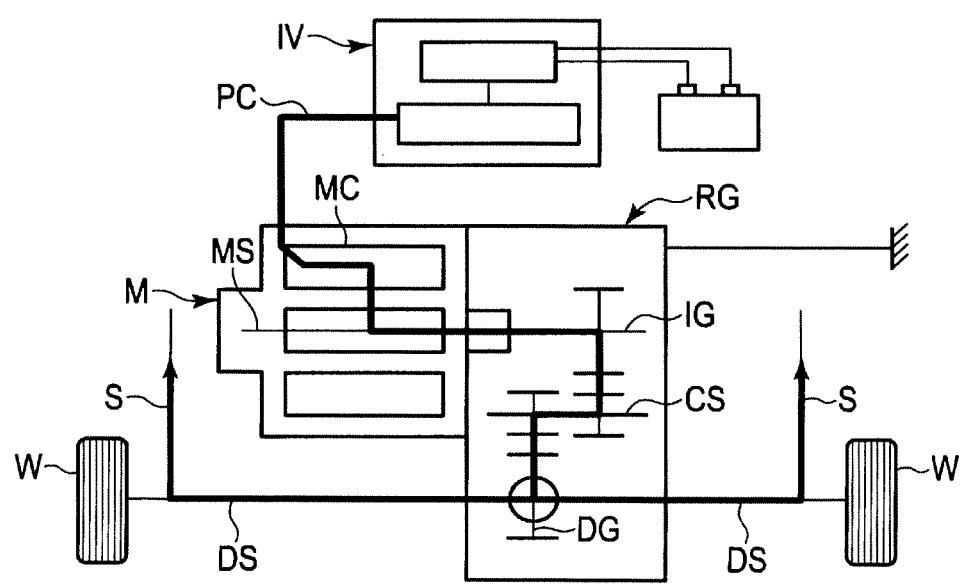

[Fig. 4]
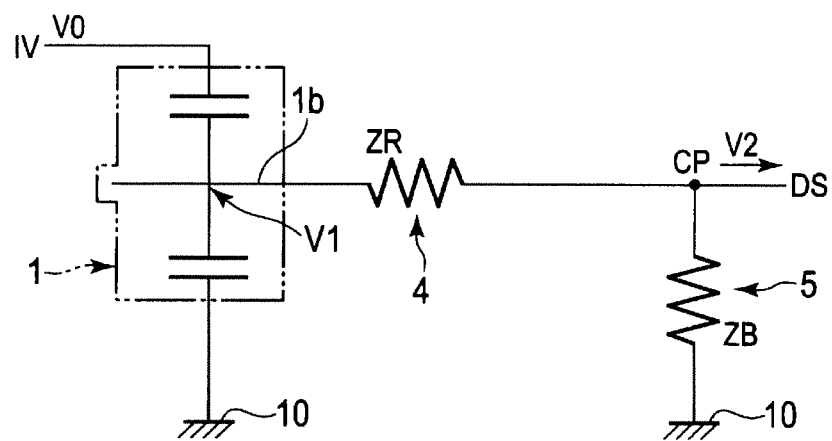

[Fig. 5A]
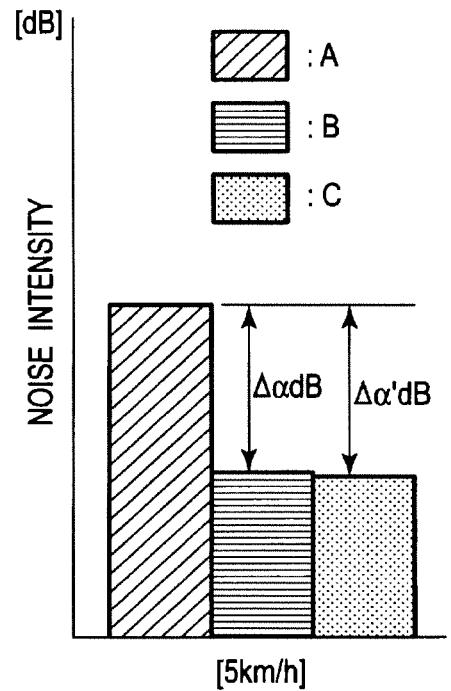
[Fig. 5B]
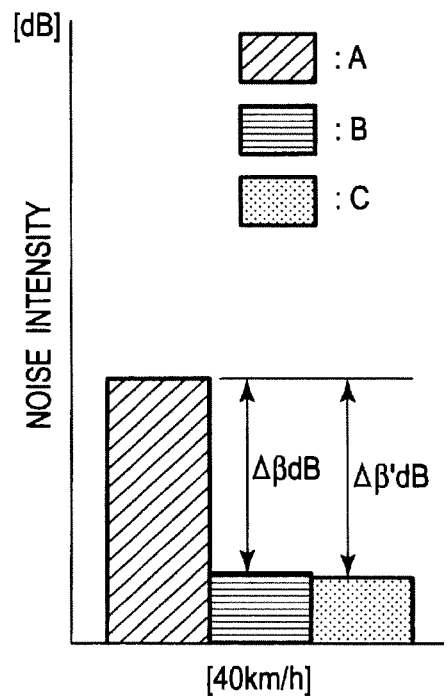

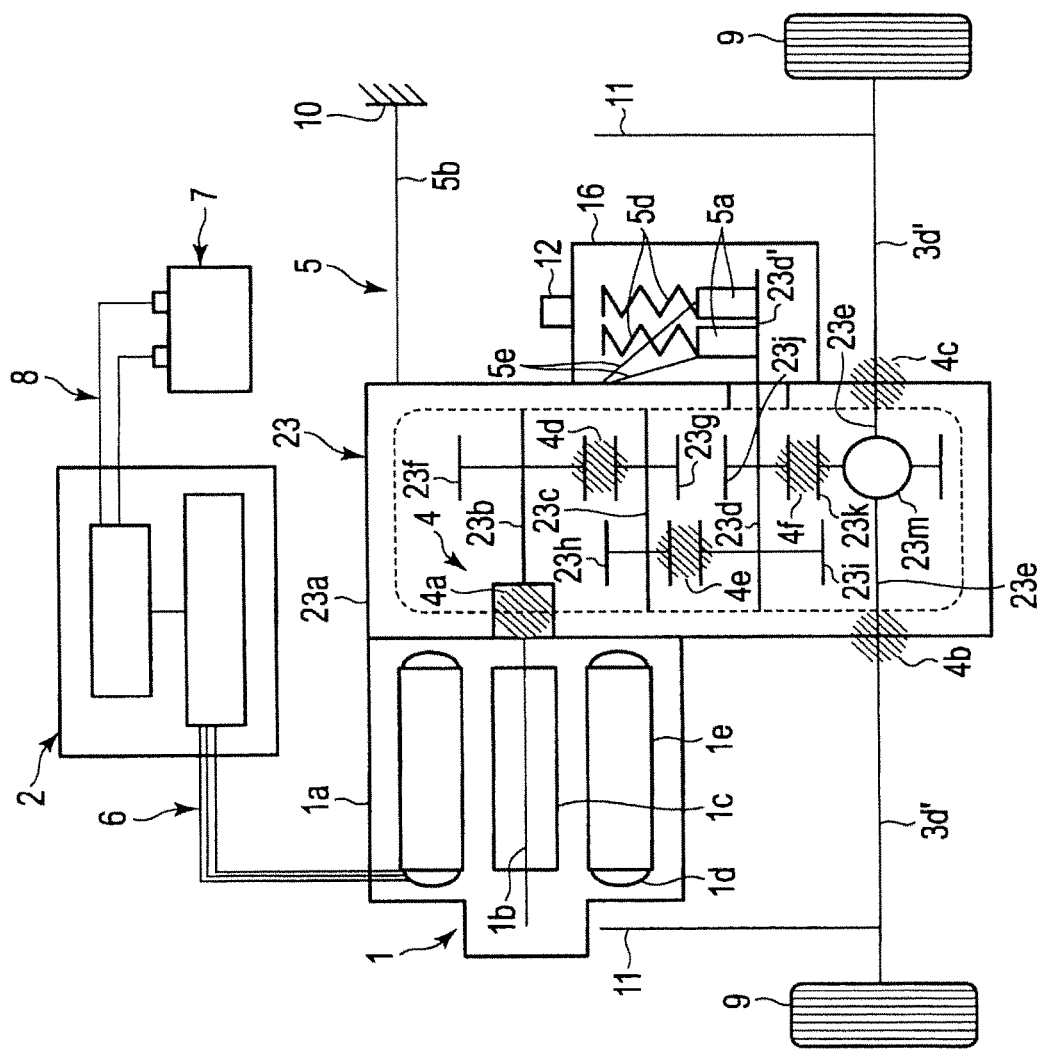
[Fig. 6]

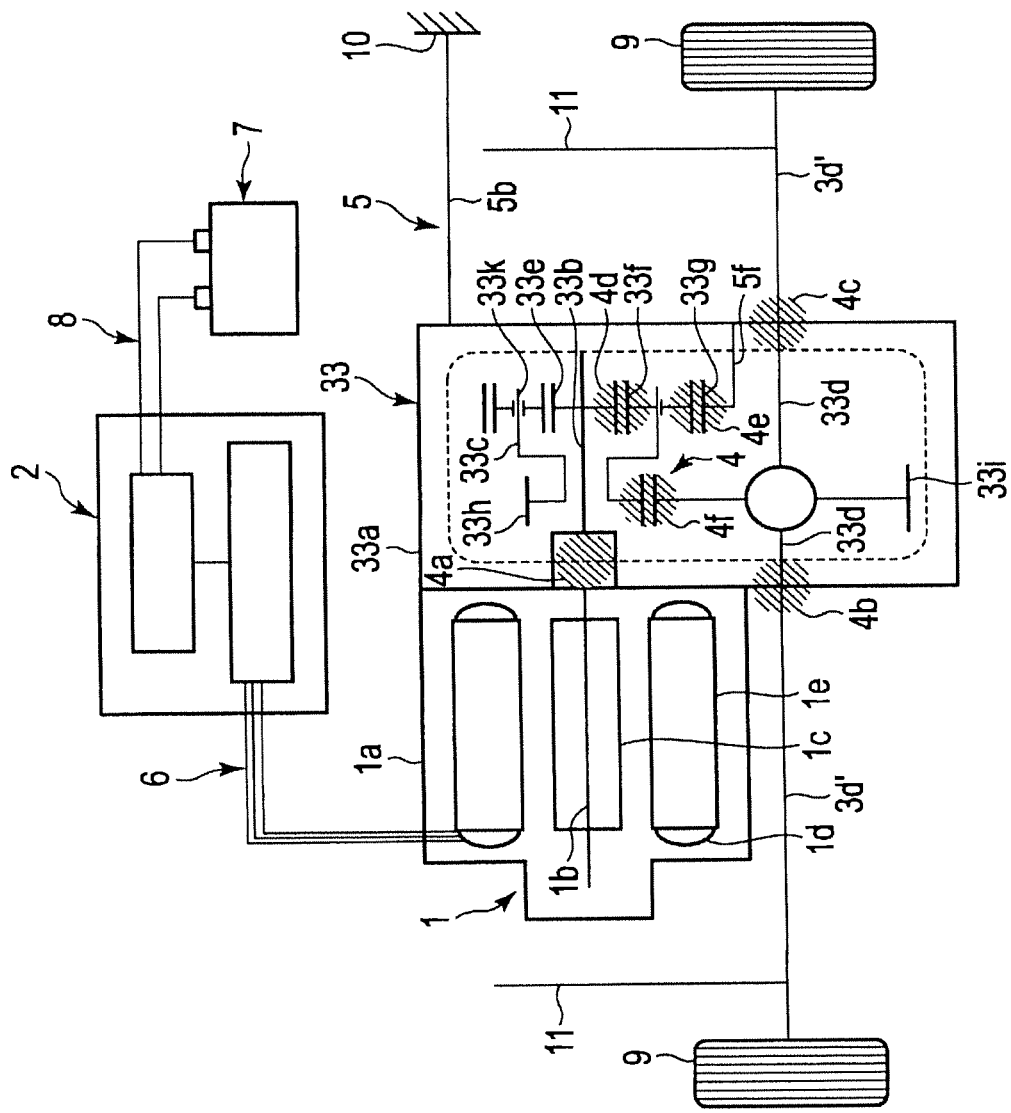
[Fig. 7]

[Fig. 8A]
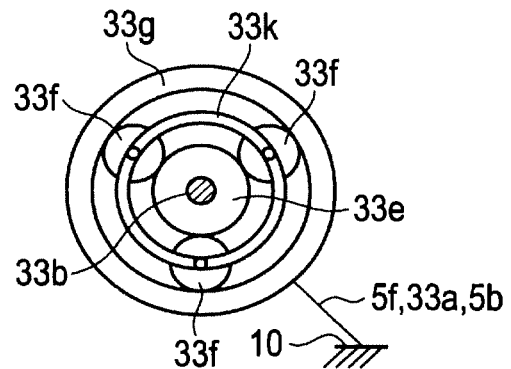
[Fig. 8B]
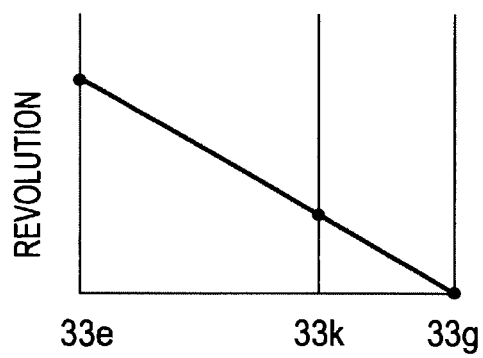
[Fig. 9]
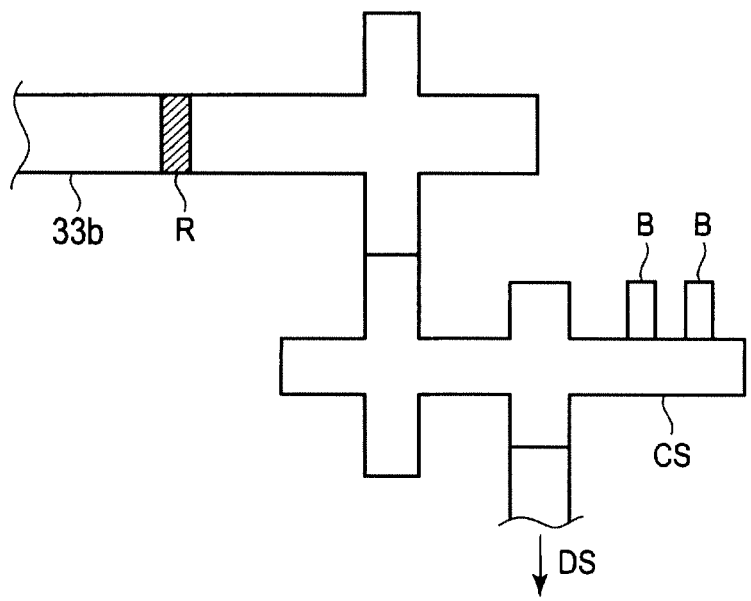

GEAR SYSTEM FOR ELECTRIC VEHICLE

This application is a continuation of U.S. application Ser. No. 13/697,663, filed Nov. 13, 2012, which claims benefit of priority from the prior Japanese Application No. 2010-121145, filed on May 27, 2010; the entire contents of all of which are incorporated herein by reference.

TECHNICAL FIELD

The present invention relates to a gear system applicable to electric vehicles with measures for preventing radiation of high-frequency noise.

BACKGROUND ART

It is known that, in an electric vehicle equipped with a motor as a driving power source, an inverter for controlling the motor generates high-frequency noise (or referred to as "radio noise") and a motor drive system including a power transmissions, suspensions and such can be antennas to radiate the high-frequency noise, which cause negative effect on radio reception.

The following document discloses a related art, which proposes having a brush in electrical contact with an output shaft of a motor and grounding the brush via a vehicle body.

CITATION LIST

Patent Literature

[PTL 1]
Japanese Patent Unexamined Application Laid-open No. 2006-320129

SUMMARY OF INVENTION

Technical Problem

In the aforementioned related art, it is expected that the output shaft along with the motor is successfully grounded via a brush and thereby noise propagation is prevented. However, the present inventors have found out that the noise further leaks out of the output shaft toward a power transmission system and suspensions and is there radiated outward.

The present inventors have further studied noise propagation in the vehicle body and have found out that an electric resistance at the brush is not sufficiently low and therefore the noise can flow beyond a part with which the brush contacts. To reduce noise propagation, it is promising to reduce the resistance at the brush. However, reduction in electric resistance at the brush is not readily achieved.

The present invention has been achieved in view of the aforementioned problem. An object of the present invention is to provide a power transmission device applicable to electric vehicles, which suppresses noise propagation from an inverter through a power transmission to drive shafts and suspensions, thereby reducing noise radiation to the exterior.

Technical Solution

According to an aspect of the present invention, a power transmission device for a vehicle is comprised of a motor including a rotor shaft and a stator having an electromagnetic coil; an inverter configured to generate an alternating current, the inverter being connected with the coil to controllably rotate the rotor shaft relative to the stator; a gear set including an input shaft coupled with and rotated by the rotor shaft, an output shaft and gears so meshed as to transmit torque of the input shaft to the output shaft; and a grounding path electrically connecting a part of the gear set with a body of the vehicle, the part being so disposed as to have the input shaft electrically interposed between the part and the rotor shaft.

BRIEF DESCRIPTION OF DRAWINGS

FIG. 1 is a schematic view of an electric vehicle with a power transmission device according to a first embodiment of the present invention, which in particular shows a relation among the power transmission device, wheels and the ground.

FIG. 2 is an enlarged cross sectional view of the power transmission device around brushes.

FIG. 3 is a schematic drawing of an electric vehicle without measures for high-frequency noise, which schematically shows propagation pathways of the noise.

FIG. 4 is a schematic drawing of an equivalent circuit with respect to the electric vehicle with the power transmission device according to the first embodiment.

FIG. 5A demonstrates noise suppression when the electric vehicle runs at 5 km/h.

FIG. 5B demonstrates noise suppression when the electric vehicle runs at 40 km/h.

FIG. 6 is a schematic view of an electric vehicle with a power transmission device according to a second embodiment of the present invention.

FIG. 7 is a schematic view of an electric vehicle with a power transmission device according to a third embodiment of the present invention.

FIG. 8A shows a planetary gear used in the power transmission device according to the third embodiment.

FIG. 8B shows revolutions of respective gear members of the planetary gear.

FIG. 9 is a schematic view of a resistor and related members according to a modified embodiment.

DESCRIPTION OF EMBODIMENTS

Exemplary embodiments of the present invention will be described hereinafter with reference to the appended drawings.

Referring to FIG. 1, a power transmission device for an electric vehicle according to a first embodiment of the present invention will be described.

The power transmission device of the first embodiment is comprised of a motor 1, an inverter 2, a first gear set 3 including a plurality of couplings and meshing parts 4 functioning as resistors, and a grounding path 5.

The motor 1 is comprised of a motor housing 1a, a rotor shaft 1b rotatably supported by the motor housing 1a, a rotor 1c drivingly coupled with the rotor shaft 1b, and stators 1e fixed to the motor housing 1a. Each stator 1e has an electric coil 1d coiled therearound. The rotor 1c is accordingly comprised of a plurality of permanent magnets, thereby being rotated by a magnetic field generated by the coils 1d. Specifically, any permanent magnet synchronous motor may be applied to the motor 1.

The inverter 2 is connected with the motor coils 1d of the motor 1 via a three-phase power cable 6, and is in turn connected with a secondary battery 7 via a power cable 8. The inverter 2 includes switching devices to convert direct current supplied by the battery 7 into alternating current and further convert alternating current from the motor 1 into direct current. Thus the inverter 2 generates alternating current to drive the motor 1 when the vehicle gathers speed, and further regenerates electric power out of the kinetic energy of the vehicle when the vehicle decelerates.

The first gear set 3 is a reduction gear set and intervenes between a rotor shaft 1b and output shafts 3d respectively coupled with wheels 9, thereby transmitting torque from the rotor shaft 1b to the output shafts 3d with reducing its speed. Of course, the first gear set 3 may be a speed-up gear set or an isokinetic gear set.

The first gear set 3 includes a combination of shafts and gears, all of which are in general carried by a gear casing 3a. The shafts include an input shaft 3b drivingly coupled with and rotated by the rotor shaft 1b, a counter shaft 3c, and output shafts 3d for driving wheels 9 in general. The gears include an input gear 3e on the shaft 3b, a first counter gear 3f on the shaft 3c meshing with the input gear 3e, a second counter gear 3g also on the shaft 3c, and a drive gear 3h on the output shafts 3d meshing with the second counter gear 3g. To allow differential motion between the right and left wheels, a differential gear 3i intervenes between the drive gear 3h and the output shafts 3d. Thus the gears are so meshed as to transmit torque of the input shaft 3b to the output shafts 3d. Of course, the gear set 3 may be comprised of a smaller or greater number of shafts and gears.

As will be understood from the above description, the gear set 3 includes a plurality of meshing parts, namely a meshing part 4d at which the gear 3e meshes with the gear 3f, and a meshing part 4e at which the gear 3g meshes with the gear 3h. These meshing parts 4d and 4e inherently have considerably greater electric resistances than those of the shafts and gears, thereby functioning as resistors. Further, while the gear set 3 may further have a spline coupling 4a for coupling with the rotor shaft 1b, and output couplings 4b, 4c for respectively coupling with drive shafts 3d', these couplings 4a, 4b, 4c also function as resistors.

The grounding path 5 includes one or more brushes 5a, one or more lead lines 5e and a connection line 5b. The brushes 5a are kept in slidable contact with, and are therefore electrically connected with, an end portion 3c' of the counter shaft 3c. The lead lines 5e are electrically connected with both the brushes 5a and the gear casing 3a. The connection line 5b establishes electric connection of the gear casing 3a with a body 10 of the vehicle. Thus the brushes 5a, the lead lines 5e and the connection line 5b in combination with the gear casing 3a constitute the grounding path 5 for electrically grounding a part of the first gear set 3. Meanwhile, in FIG. 1, left and right suspensions 11 are further illustrated.

Details of the brushes 5a and related parts will be further described with reference to FIG. 2, hereinafter.

The counter shaft 3c is rotatably supported by the gear casing 3a with having a ball bearing 13 interposed therebetween. The counter shaft 3c is, within a gear chamber 3j inside the casing 3a, splined to drivingly engage with the first counter gear 3f. At an opposite end side relative to the bearing 13, an oil seal 14 is provided so as to seal oil within the casing 3a. Any anti-displacement means such as a snap ring 15 is secured to the end portion 3c' of the counter shaft 3c. The end portion 3c' is preferably further elongated outward, where the brushes 5a, preferably provided in pair, are kept in contact with the counter shaft 3c.

A cover 16 is attached to the casing 3a so as to cover the brushes 5a and the end portion 3c'. The cover 16 and the gear casing 3a enclose a brush chamber 17 and the cover 16 is preferably comprised of a breather connector 12 to assure air ventilation.

Within the brush chamber 17, a brush case 5c of an electrically non-conductive material is secured to the gear casing 3a by means of an elongated portion 3a' of the casing 3a with a securing means such as a bolt. Each brush 5a along with a compressed spring 5d is housed in the brush case 5c and is thus urged toward the end portion 3c' of the counter shaft 3c. The lead lines 5e connected with the brushes 5a are led out of the brush case 5c and are electrically connected with the gear casing 3a.

How the present embodiment suppresses noise radiation will be described hereinafter.

As described above, it is known that, in an electric vehicle or a so-called hybrid vehicle, an inverter for controlling a motor generates high-frequency noise and a motor drive system including a power transmission system and suspensions can be antennas to radiate the high-frequency noise, which causes negative effect on radio reception.

FIG. 3 schematically illustrates such noise radiation. An inverter includes switching devices which repeat turn on and off current flow, thereby generating alternating current. Each time the switching devices turn on current flow, sharp rising edges occur in the current flow and in turn cause high-frequency noise. The high-frequency noise, as illustrated by thick lines in FIG. 3, flows through a power cable PC and a motor coil MC to a rotor shaft MS of a motor M. Without any measure for high-frequency noise, the noise further flows through an input gear IG, a counter shaft CS, a differential gear DG and drive shafts DS to suspensions S of the vehicle. These noise conduction paths as a whole function as an antenna for radiating the noise to the exterior.

If a brush is provided and grounded, an equivalent circuit can be drawn in a way as shown in FIG. 4. An output voltage V2 of the noise present at a connection point CP where the brush contacts with any part of the power transmission device is represented by an equation:

$$V2 = \{ZB/(ZB+ZR)\} \times V1 \tag{1},$$

where V1 represents a voltage of the noise present at the rotor shaft 1b, ZR represents a resistance present between the shaft 1b and the connection point CP, and ZB represents a resistance through the brush toward the ground.

The lower the voltage V2 is, the less the noise current flows beyond the connection point toward the drive shaft DS. Thus suppression of the voltage V2 is required in order to suppress noise radiation.

As will be understood from the above equation (1), both increase in the resistance ZR and decrease in the resistance ZB are effective in suppression of the voltage V2 at the connection point CP, which leads to suppression of noise radiation as described above.

If a brush contacts with a rotor shaft as with the art disclosed in the PTL 1, substantially there is not a resistive element between the rotor shaft 1b and the connection point CP. Thus the resistance ZR is relatively low and the resistance ZB is relatively high. A considerable amount of noise may flow beyond the connection point CP toward the drive shaft DS, where the noise is radiated.

In contrast, according to the present embodiment, as the brushes 5a are kept in electrical contact with the end portion 3c' of the counter shaft 3c, the coupling 4a and the meshing part 4d are electrically interposed between the rotor shaft 1b and the part where the grounded brushes 5a electrically contacts with the counter shaft 3c. The coupling 4a and the meshing part 4d have considerably high resistance as described earlier. Thus the resistance ZR is made relatively high, thereby reducing the noise voltage V2 and suppressing the noise current flowing beyond the connection point CP.

The brushes 5a may be disposed in any location in the first gear set 3 as far as one or more electrically resistive elements are electrically interposed between the rotor shaft 1b and a part where the grounded brushes 5a electrically contacts with the first gear set 3. As the resistive elements, meshing parts between any meshing gears, couplings, and any resistor connected in series in a shaft or a gear can be exemplified. This structure effectively suppresses noise radiation.

The effect of noise suppression is further demonstrated in FIGS. 5A and 5B. Each figure compares three cases of; (A) the rotor shaft 1b is grounded at a location A shown in FIG. 1; (B) the input shaft 3b is grounded at a location B; and (C) the counter shaft 3c is grounded at a location C (the present embodiment). FIG. 5A shows cases where a vehicle runs at 5 km/h, and FIG. 5B shows case where a vehicle runs at 40 km/h. Each axis of ordinate represents radiated noise intensities measured in decibels relative to a standard intensity.

Both FIGS. 5A and 5b illustrate that the case (A) (the rotor shaft 1b is grounded) provides the greatest noise intensities. In the case (B) (the input shaft 3b is grounded) as compared with the case (A), the noise intensities are suppressed. In the case (C) (the counter shaft 3c is grounded), the noise intensities are further suppressed.

As well as the aforementioned effects, the present embodiment further provides the following effects.

The oil seal 14 intervenes between the gear chamber 3j in which lubricant oil circulates and the brush chamber 17 which houses the brushes 5a, thereby separating these chambers. Thus the oil does not ill-affect electrical continuity between the brushes 5a and the counter shaft 3c, and further fragments rubbed off from the brushes 5a or the counter shaft 3c do not ill-affect lubrication in the gear chamber 3j.

As the breather 12 establishes ventilation between the brush chamber 17 and the exterior, pressure difference therebetween is effectively prevented. This results in prevention of oil leakage to the brush chamber 17, which may be driven by differential pressure.

In the aforementioned first embodiment, the reduction gear with three shafts is used. A gear set with four or more shafts may be alternatively used. FIG. 6 illustrates a second embodiment in which an electric vehicle includes a second gear set 23 of a reduction gear set with four shafts.

The second gear set 23 intervenes between a rotor shaft 1b and output shafts 23e coupled with wheels 9, thereby transmitting torque from the rotor shaft 1b to the output shafts 23e with reducing its speed.

The second gear set 23 includes a combination of shafts and meshing gears, all of which are in general carried by a gear casing 23a. The shafts include an input shaft 23b drivingly coupled with and rotated by the rotor shaft 1b, a first counter shaft 23c, a second counter shaft 23d and output shafts 23e for driving wheels 9 in general. The gears include an input gear 23f on the input shaft 23b, first counter gears 23g, 23h on the first counter shaft 23c, one of which meshes with the input gear 23f, second counter gears 23i, 23j on the second counter shaft 23d, one of which meshes with the first counter gear 23h, and a drive gear 23h on the output shafts 23e meshing with the second counter gear 23j. To allow differential motion between the right and left wheels, a differential gear 23m intervenes between the drive gear 3h and the output shafts 23e. Thus the gears are so meshed as to transmit torque of the input shaft 23b to the output shafts 23e. Of course, the gear set 23 may be comprised of a smaller or greater number of shafts and gears.

The gear set 23 includes a spline coupling 4a, meshing parts 4d, 4e, 4f where gears 23f, 23g, 23h, 23i, 23j, 23k mesh with each other, and output couplings 4b, 4c, all of which are electrically resistive.

A grounding path 5 includes one or more brushes 5a in slidable contact with an end portion 23d' of the second counter shaft 23d. The brushes 5a are grounded through the gear casing 3a and the connection line 5b, thereby grounding the second counter shaft 23d. Of course, location of the brushes 5a may be modified so as to electrically ground any other shaft 23b, 23c or 23e.

The second embodiment provides the same effects as those of the first embodiment.

Alternatively, epicyclic gearing or planetary gearing may be used instead of the aforementioned reduction gears of a parallel shaft system. FIG. 7 illustrates a third embodiment in which a gear set 33 with planetary gearing is used.

The power transmission device of the third embodiment is comprised of a motor 1, an inverter 2, the gear set 33 including electrically resistive elements 4, and a grounding path 5. Aside from the gear set 33, those as described earlier can be applied to these components 1, 2 and 5 and therefore detailed descriptions thereof will be omitted.

The gear set 33 intervenes between a rotor shaft 1b of the motor 1 and output shafts 33d, thereby transmitting torque from the rotor shaft 1b to the output shafts 33d.

The gear set 33 includes a combination of shafts and meshing gears, all of which are in general carried by a gear casing 33a. The shafts include an input shaft 33b, a cylindrical shaft 33c coaxial with the input shaft 33b and an output shaft 33d. The gears include a planetary gear set of a single pinion type, which is comprised of a sun gear 33e, pinions 33f meshing with and revolving about the sun gear 33e, a ring gear 33g meshing with the pinions 33f, and an output gear 33h for output. A pinion carrier 33k holds the pinions 33f and the cylindrical shaft 33c is secured thereto. The gear set 33 further includes a differential gear having a drive gear 33i meshing with the output gear 33h.

The ring gear 33g is secured to gear casing 33a by means of a connection member 5f as shown in FIGS. 7 and 8A. Therefore, when the sun gear 33e rotates, the pinions 33f along with the pinion carrier 33k revolves with reduced revolution relative to the sun gear 33e on the basis of the stationary ring gear 33g as shown in FIG. 8B. Thus torque with reduced speed is output to the output gear 33h and further transmitted to the output shafts 33d via the differential gear.

The connection member 5f also establishes electric connection between the ring gear 33g and the gear casing 33a. A connection line 5b electrically connects the gear casing 33a with the body 10 of the vehicle. Thus the connection member 5f, the gear casing 33a and the connection line 5b constitute the grounding path 5 for electrically grounding the ring gear 33f.

Both a meshing part 4d between the gears 33e and 33f and a meshing part 4f between the gears 33h and 33i are electrically resistive. Further, while the gear set 3 may further have a spline coupling 4a for coupling with the rotor shaft 1b and output couplings 4b, 4c for respectively coupling with wheel shafts 3d', the couplings 4a, 4b, 4c are also resistive.

As the connection member 5f is electrically connected with the ring gear 33g, at least the meshing parts 4d, 4e and the coupling 4a, as electrically resistive elements, are interposed between the rotor shaft 1b and the connection member 5*f*. Thus the resistance ZR in its equivalent circuit shown in FIG. 4 is made relatively higher. Therefore the noise voltage V2 is reduced as described above and then noise radiation is suppressed.

Any various modifications would occur. FIG. 9 illustrates one of such modifications. In this illustration, a resistor R is connected in series in the input shaft 33*b*. As the resistor R increases an electric resistance on the line of the input shaft 33*b* and the counter shaft CS interposed between brushes B and a rotor shaft (not shown), noise flowing toward the drive shaft DS is suppressed. Location of the resistor R may be alternatively changed.

To ground a part of the gear set, any means other than the brushes 5*a* and the connection member 5*f* may be alternatively used as far as one or more electrically resistive elements are electrically interposed between the motor and the means.

The teachings as described above can be also applied to continuously variable transmissions. Further the teachings can be also applied to so-called hybrid vehicles, fuel cell vehicles, or any other vehicles where noise radiation is concerned.

Although the invention has been described above by reference to certain exemplary embodiments of the invention, the invention is not limited to the exemplary embodiments described above. Modifications and variations of the embodiments described above will occur to those skilled in the art, in light of the above teachings.

INDUSTRIAL APPLICABILITY

A power transmission device applicable to electric vehicles, which suppresses noise propagation from an inverter through a power transmission device to drive shafts and suspensions, thereby reducing noise radiation to the exterior.

The invention claimed is:

1. A gear system for a vehicle used in combination with an inverter and a motor electrically connected to and driven by the inverter, comprising:
    a gear casing spatially separate from a housing of the motor;
    a gear set confined in the gear casing, the gear set including an input shaft coupled with and rotated by the motor, an output shaft, meshed gears, and one or more counter shafts driven only by the meshed gears to mediate transmission of torque from the input shaft to the output shaft;
    a spline coupling drivingly interposed between a rotor shaft of the motor and the input shaft, the spline coupling functioning as a resistor; and
    a grounding path electrically connecting a connection point on the one or more counter shafts with a body of the vehicle, the connection point being positioned such that at least one engagement among the meshed gears is interposed between the input shaft and the connection point,
    wherein the grounding path functions as a resistor for attenuating radio noise flowing from the inverter beyond the connection point toward the output shaft.

2. The gear system of claim 1, further comprising:
    a brush in slidable contact with one selected from the group consisting of the input shaft, the one or more counter shafts, or the output shaft, and connected with the grounding path so as to electrically connect the connection point of the one or more counter shafts of the gear set with the body of the vehicle.

3. The gear system of claim 2, wherein the gear casing is electrically connected with the grounding path; and
    the gear system further comprises a lead line electrically connected with the brush and the gear casing.

4. The gear system of claim 2, further comprising:
    an oil seal intervening between the gear set and the brush.

5. The gear system of claim 4, further comprising:
    a brush chamber housing the brush; and
    a breather communicating with the brush chamber and an outside of the brush chamber.

6. The gear system of claim 1, wherein the connection point is an end portion of any of the one or more counter shafts.

7. The gear system of claim 1, wherein the gear casing is isolated from the housing of the motor.

8. The gear system of claim 4, wherein the oil seal seals oil within the gear casing.

9. The gear system of claim 1, further comprising:
    a cover attached to the gear casing,
    wherein the one or more counter shafts are entirely disposed within the gear casing and the cover.

10. The gear system of claim 5, further comprising:
    a cover attached to the gear casing,
    wherein the brush chamber is enclosed by the gear casing and the cover.

11. The gear system of claim 2, further comprising:
    a cover attached to the gear casing,
    wherein the gear casing and the cover define a brush chamber in which a brush case is provided, and
    wherein the brush case is attached to the gear casing and houses the brush.

12. The gear system of claim 11, further comprising a brush spring having one end connected to an interior of the brush case and another end connected to the brush.

13. The gear system of claim 11, wherein the brush case is made of an electrically non-conductive material.

14. The gear system of claim 1, wherein the gear set and the motor are not within a same case.

* * * * *